(12) United States Patent
Sim et al.

(10) Patent No.: US 8,077,438 B2
(45) Date of Patent: Dec. 13, 2011

(54) PEAK CURRENT LIMITING APPARATUS

(75) Inventors: Jung Wook Sim, Chungcheongbuk-do (KR); Kwon Bae Park, Daejeon (KR); Gyeong Ho Lee, Chungcheongbuk-do (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 458 days.

(21) Appl. No.: 12/359,219

(22) Filed: Jan. 23, 2009

(65) Prior Publication Data

US 2009/0195954 A1 Aug. 6, 2009

(30) Foreign Application Priority Data

Feb. 5, 2008 (KR) .................. 10-2008-0011856

(51) Int. Cl.
  *H02H 3/00* (2006.01)
(52) U.S. Cl. .......................................... 361/19; 361/93.9
(58) Field of Classification Search ............... 361/19, 361/93.9
  See application file for complete search history.

(56) References Cited

U.S. PATENT DOCUMENTS 7,538,991 B2 * 5/2009 Park et al. ................... 361/19
2009/0052097 A1 * 2/2009 Hyun et al. .................. 361/19

* cited by examiner

*Primary Examiner* — Rexford Barnie
*Assistant Examiner* — Angela Brooks
(74) *Attorney, Agent, or Firm* — Lee, Hong, Degerman, Kang & Waimey

(57) ABSTRACT

The present disclosure is related to a peak current limiting apparatus of the present disclosure comprising a trigger element serially connected between a power supply source and the load, diverting a fault current to other paths connected in parallel when the fault current exceeding a threshold is generated, a main contact switch serially connected between the trigger element and a load, a driving coil connected in parallel with the trigger element, and generating a repulsive force in response to the fault current to detach a contact point of the main contact switch, and a peak limiting impedance element serially connected between a connection node between the trigger element and the main contact switch and the driving coil, and limiting a first peak level of the fault current flowing through the driving coil to a predetermined level.

9 Claims, 4 Drawing Sheets

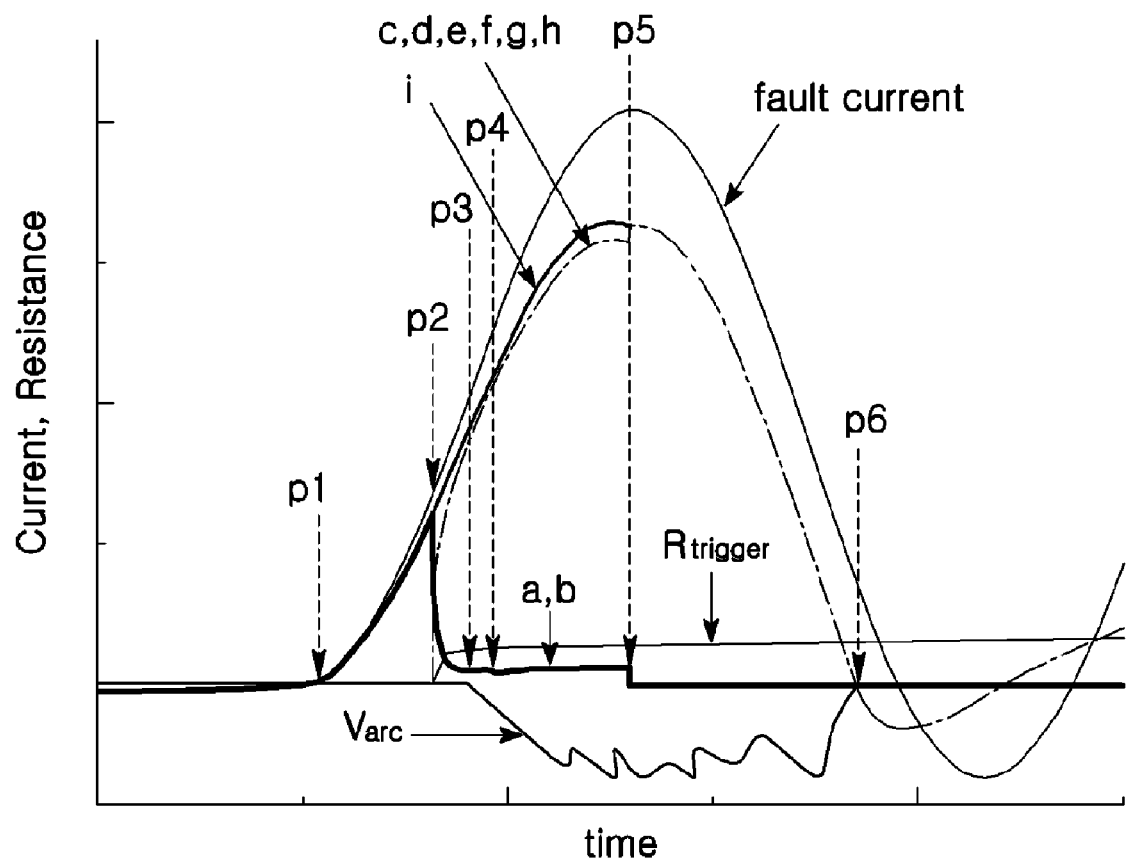

PEAK CURRENT LIMITING APPARATUS

CROSS-REFERENCE TO RELATED APPLICATION

The present application is based on, and claims priority from, Korean Application Numbers 10-2008-011856, filed Feb. 5, 2008, the disclosure of which is incorporated by reference herein in its entirety.

BACKGROUND OF THE DISCLOSURE

1. Field of the Disclosure

The present disclosure relates to a peak current limiting apparatus, and more particularly to a peak current limiting apparatus capable of limiting a fault current more than a threshold value to thereby protect electric appliances connected to electric power systems.

2. Discussion of the Related Art

An electric power system is generally mounted with a current limiter for limiting a fault current more than a threshold value in order to protect against burning and damage by the fault current caused by accidents such as thunder-stroke, earth fault and short-circuit, and a circuit breaker for detaching itself to prevent the fault current from load.

The current limiter serves to limit a fault current more than a threshold value to reduce mechanical, thermal and electrical stresses caused by electric power appliances such as, for example, bus bars, insulators and circuit breakers to a minimum and to protect the electric appliances against the fault current.

On the other hand, a circuit breaker connected to an electric power system detects an over-current more than a threshold value, breaks the connection with the electric power system in accordance with control of an over-current relay generating a breaking signal and thus prevents the over-current from flowing into the electric power system.

Meanwhile, 3 to 5 periods of the fault current are required in a circuit breaker for breaking an over-current more than a threshold value in response to control of an over-current relay, which is due to the fact that a considerable time is required for the over-current relay to detect a fault current exceeding a threshold value.

As a result, the over-current relay may suffer from a drawback that it cannot detect the fault current if the current limiter is operated earlier than a time when the fault current exceeding the threshold occurs to thereby limit the fault current that exceeds a predetermined level.

SUMMARY OF THE DISCLOSURE

An object of the present disclosure is to provide a peak current limiting apparatus capable of limiting a fault current more than a threshold value after a considerable time so that electrical power appliances such as an over-current relay and a circuit breaker connected to an electrical power system can inter-work.

In another aspect of the present disclosure is to provide a peak current limiting apparatus capable of limiting a fault current below a rated short circuit breaking current at a predetermined level so that electric power apparatus connected to electric power systems should not be burnt or damaged before the fault current is limited when the fault current exceeding a threshold occurs.

In one general aspect of the present disclosure, A peak current limiting apparatus comprising: a trigger element serially connected between a power supply source and the load, and diverting a fault current to other paths connected in parallel when the fault current exceeding a threshold is generated; a main contact switch serially connected between the trigger element and the load; a driving coil connected in parallel with the trigger element, and generating a repulsive force in response to the fault current to detach a contact point of the main contact switch; and a peak limiting impedance element serially connected between the driving coil and a connection node between the trigger element and the main contact switch, and limiting a first peak level of the fault current flowing through the driving coil to a predetermined level.

Implementations of this aspect may include one or more of the following features.

In another aspect of the present disclosure, The peak current limiting apparatus may further comprising a first operating switch connected to the driving coil in parallel, and conducting the fault current by being in contact with a contact point thereof after the contact point of the main contact switch are detached.

In another aspect of the present disclosure, The peak current limiting apparatus may further comprising a second operating switch connected in parallel with the peak limiting impedance element and conducting the fault current limited by the peak limiting impedance element by being in contact with a contact point of the second operating switch after a contact point of the main contact switch are detached.

In another aspect of the present disclosure, Alternatively, the peak current limiting apparatus may further comprising a second operating switch configured to conduct a fault current limited by the peak impedance element by being in contact with a contact point of the second operating switch after the contact point of the first operating switch are closed.

In another aspect of the present disclosure, each gap between contact points of the first operating switch and gap between contact points of the second operating switch is smaller than that of the main contact switch to allow being in contact before the contact point of the main contact switch being completely detached, where the gap between contact points of the first operating switch is smaller than that of the second operating switch.

The terminology "current zero point" in this disclosure defines a point where a current value reaches null or zero. In another aspect of the present disclosure, an arc generated from the main contact point switch by detaching the contact point is extinguished when the fault current comes to a current zero point made of a half period of the fault current, where the contact point of the main contact switch are completely detached.

The peak current limiting apparatus according to the present disclosure serves to limit a fault current after a considerable time to allow an electric power appliances connected to an electric power system, particularly, a circuit breaker to operate when the fault current more than a threshold value is generated, and to restrict thermal and mechanical stresses of the power electric devices by limiting the fault current generated prior to the current limiting below a predetermined rated short circuit breaking current of the electric power appliances.

As a result, a circuit breaker is controlled by an over-current relay functions. The circuit breaker prevent a fault current exceeding a threshold value from flowing to the load by detecting the fault current exceeding the threshold value, where, the fault current detected by the circuit breaker being the current limited below the rated short circuit breaking current, the electric power devices including the circuit breaker can operate without being damaged thermally and mechanically, such that there is an advantageous effect of prolonging the life of the electric power appliances.

That is, the peak current limiting apparatus can protect the electric power system and appliances by inter-working with the electric power appliances connected to the electric power system.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3*b* is a graph illustrating a detailed transition in FIG. 3*a*.

DETAILED DESCRIPTION OF THE DISCLOSURE

Hereinafter, embodiments of the present disclosure are described in detail with reference to the accompanying drawings. Detailed descriptions of well-known functions, configurations or constructions are omitted for brevity and clarity so as not to obscure the description of the present disclosure with unnecessary detail. The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Figure 1:
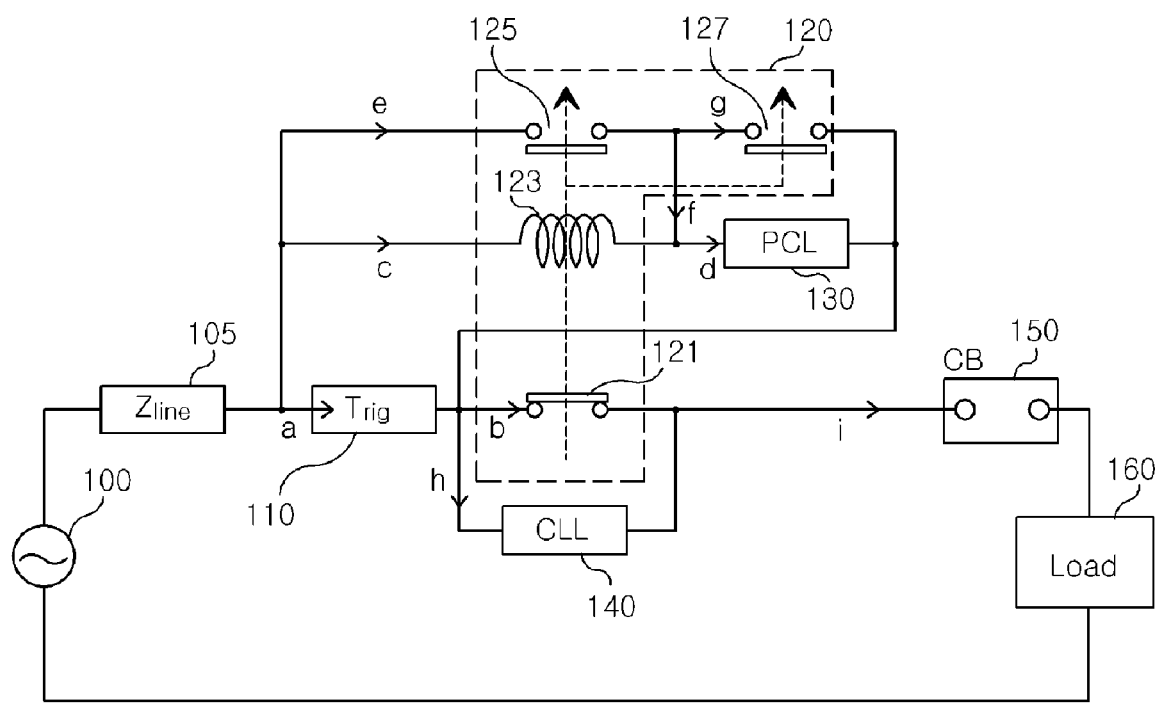
FIG. 1 is a block diagram illustrating construction of a peak current limiting apparatus according to one embodiment of the present disclosure.
Figure 2:
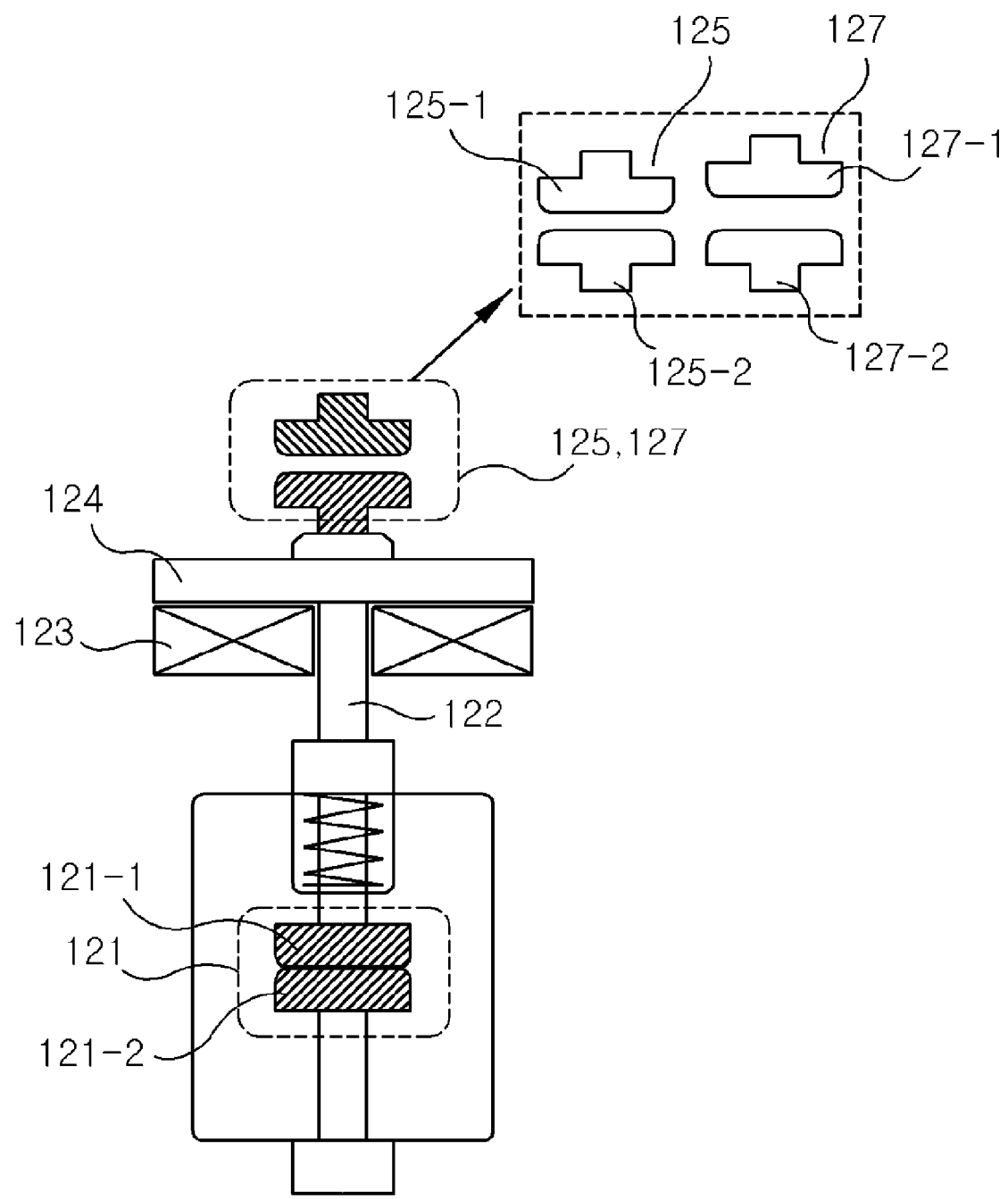
FIG. 2 is a schematic drawing illustrating a detailed construction of an integral high speed switching module of FIG. 1.

FIG. 1 is a block diagram illustrating construction of a peak current limiting apparatus according to one embodiment of the present disclosure, and FIG. 2 is a schematic drawing illustrating a detailed construction of an integral high speed switching module of FIG. 1.

Referring to FIG. 1, a path in which a power from a power supply source 100 is supplied to a load 160 is formed by connecting the electric power source 100 to the load 160 by means of an electric power line (Zline. 105). The electric power line 105 has a predetermined impedance value for optimizing a transfer characteristic of electric power. The path may be arranged in plural numbers, and each path is connected to various electric power appliances for supplying a stable electric power.

To be more specific, the main contact point switch 121 contacted to the trigger element 110 is serially connected in the power source supply path (a). The main contact point switch 121 includes a contact point. The contact point is contacted each other in normal situation. That is, the main contact switch 121 and a trigger element 110 are serially connected between the electric power line 105 and the load. In case a normal current flows in the power source supply path, the normal current may flow to the load 160 via the trigger element 110 and the main contact point switch 121. Furthermore, a driving coil 123 and a peak limiting impedance element 130 are serially connected in a first diverting path (c) connected to the power source supply path (a) in parallel. That is, the driving coil 123 and the peak limiting impedance element 130 are connected to the trigger element in parallel. In case a fault current more than a threshold value is generated, the fault current diverted by the trigger element 110 may flow to the driving coil 123 and the peak limiting impedance element 130.

Furthermore, a first operating switch 125 and a second operating switch 127 is serially connected in a second diverting path (e) connected to the first diverting path (c) in parallel. If a contact point of the first operating switch 125 and a contact point of the second operating switch 127 are brought into contact, the fault current flows through the first and second operating switches 125 and 127 to protect electric appliances connected to each path. In addition, a current limiting load 140 for limiting the fault current is in parallel the main contact switch in a current limiting path (h). A third diverting path (f) is formed by connecting the first operating switch 125 of the second diverting path (e), a connection node of the second operating switch 127, a driving coil 123 of the first diverting path (c) and a connection node of the peak limiting impedance device 130.

That is, the peak current limiting apparatus according to the present disclosure may include a plurality of diverting paths that include a power source supply path, where the power source supply path is a main route for stably supplying a power of the power supply source to the load when a normal current flows, and the plurality of diverting paths is routes in which a fault current flows when a fault current over the threshold value is generated, and the current limiting path is a route for limiting the fault current. The detailed description thereto will be given later.

When there is generated a fault current exceeding the threshold value while a power supplied from the electric power supply source 100 is supplied to the load 160 without loss in low impedance state during a normal operation, the trigger element 110 is changed to a high impedance state to divert the threshold-exceeding fault current to the first diverting path (c). That is, the trigger element 110 performs the current conduction in a low impedance state during a normal operation but may be changed from the low impedance state to a high impedance state to divert the fault current to the first diverting path (c) when there is generated an accident.

The trigger element 110 may be a superconductor, a PTCR (Positive Temperature Coefficient Resistor) or a liquid metal. Preferably, the trigger element 110 is changed to a high impedance state at least within one quarter of a period of a fault current when the fault current over a threshold value is generated.

Referring to FIG. 2, the integral high speed switch module may include a main contact point switch 121, a driving coil 123, a first operating switch 125, and a second operating switch 127. Referring to a configuration where a normal current flows, the driving coil 123 abuts on a lower surface of a repulsive plate 124, and an shaft 122 is extensively coupled by a lower lateral parts of the repulsive plate 124. An end of the shaft 122 is connected to a contact point 121-1 of the main contact point switch 121 whose the contact point is contacted in normal situation. An upper surface of the repulsive plate 124 is brought into contact by contact point 125-2, 127-2 of the first and second operating switch 125 and 127.

Successively, when the trigger element 110 allows a fault current exceeding a threshold value to flow to the driving coil 123, the driving coil 123 generates a repulsive force, and the repulsive plate 124 is moved upward by the repulsive force. As a result, the contact point 121-1 of the main contact point switch 121 is moved upward along with the shaft 122 to be detached from the other contact point 121-2 of the fixed main contact point switch 121. The contact points 125-2, 127-2 of the first and second operating switches 125, 127 are brought into contact with the other contact points 125-1, 127-1 of the first and second operating switches 125, 127.

Now, referring to each element of the integral high speed switching module 120, the driving coil 123 is connected to the first diverting path (c) connected in parallel to the trigger element 110 to generate a repulse force, in case a fault current more than a threshold value diverted by the trigger element 110 flows.

The main contact point switch 121 is serially connected to the trigger element 110 to conduct a normal current when the contact point thereof are brought into contact each other, but generates an arc as the connected contact point are detached by the repulsive force more than a threshold value generated by the driving coil 123. A conduction path is formed by the arc between the contact points of the main contact point switch.

Now, a more detailed description will be made thereto. When an fault current more than a threshold value flows on the driving coil 123 of the integral high speed switch module 120, an eddy current is induced to generate an electronic repulsive force, whereby the connected contact point of the main contact point switch 121 are detached by the repulsive plate 124 that moves upwards. That is, one of the contact point 121-1 of the main contact point switch 121 connected via the shaft 122 and the repulsive plate 124 which is an inter-working means is moved upward along with the upward-moving repulsive plate 124, whereby the contacted contact point of the main contact point switch 121 generate an arc when the contacted contact point begin to detach.

The arc generated by the main contact point switch 121 is quenched when it comes to a current zero point made of a half period of the fault current, and the contact point of the main contact point switch 121 are completely detached.

The detached contact point of the first operating switch 125 come into contact when the contact point of the main contact point switch 121 are detached and a gap between the detached contact point of the main contact point switch 121 reaches a predetermined first gap. The detached contact point of the second operating switch 127 come into contact when the contact point of the main contact point switch 121 are detached and a gap between the detached contact point of the main contact point switch 121 reaches a predetermined second gap.

At this time, each gap between contact points of the first and second operating switch 125 and 127 is smaller than that of the main contact point switch 121. The contact point of the first operating switch 125 comes into contact before the contact point of the main contact point switch 121 is completely detached. The contact point of the second operating switch 127 comes into contact after the contact point of the first operating switch 125 is brought into contact. The gap between the contact points of the first operating switch 125 may be smaller than that of the second operating switch 127.

As a result, the first operating switch 125 can protect the driving coil 123 against the thermal damage by not allowing the fault current to flow only into the driving coil. That is, most of the fault current flows into the driving coil but a predetermined portion of the fault current is diverted into the first operating switch 125 when the contact point of the first operating switch 125 is brought into contact. The first operating switch 125 protects the driving coil against the damages and restricts generation of excessive repulsive force between the repulsive plates 124, whereby the integral high speed switching module 120 can be avoided from damages.

The contact point of the second operating switch 127 is brought into contact following a first peak value of the fault current more than a threshold value. That is, after a predetermined value of the fault current is restricted by the peak limiting impedance element 130, the contact point of the second operating switch 125 is contacted immediately. A conduction time in which the fault current flows into the peak limiting impedance element 130 can be reduced to allow designing a peak limiting impedance device having a smaller thermal capacity.

When the contact point of the second operating switch 127 is brought into contact, almost all of the fault currents are diverted to the second diverting path (e), whereby the thermal stress that may be generated from each element including the trigger element by the fault current can be prevented.

In a nutshell, the arrangement of the integral high speed switching module 120 makes it possible to prevent the fault current diverted by the trigger element 110 from damaging each element so as to limit the diverted fault current.

The peak limiting impedance element 130, which is a PCL (Peak Control Load) limiting the fault current at a predetermined level, is serially connected to the driving coil 123. The peak limiting impedance element 130 is limit to a predetermined level the fault current flowing through the driving coil 123 or the fault current flowing through the third diverting path (f) via the first operating switch 125.

Now, functions of the peak limiting impedance element 130 will be described in detail. The electric power system is connected to electric power appliances such as, for example, a circuit breaker, a switch, a transformer and a power fuse. The electric power appliances are defined with a rated short circuit breaking current. A fault current more than the rated short circuit breaking current flowing in the appliance may bring about malfunctions caused by thermal mechanical damages to the appliance to thereby shorten the life. The peak limiting impedance element 130 is utilized to limit the fault current flowing the electric power appliance to a level lower than the rated short circuit breaking current of the electric power appliance when a fault current occurs.

Preferably, the peak limiting impedance element 130 is set at a low impedance value of 1~100 mΩ in order to limit a maximum fault current to within a scope that causes no problem to a mechanical strength of the electric power appliances such as a pre-installed circuit breaker. The reason of limiting the maximum fault current within the scope is that, the parallel-connected trigger element 110 is in the low impedance state when a normal current flows, and if the impedance value is too high, a very large voltage drop may occur across the trigger element 110.

A CLL (Current Limiting Load) is connected to the current limiting path (h) connected in parallel with the main contact point switch 121. When the contact point of the main contact point switch 121 is detached and the generated arc is quenched, the CLL limits the fault current flowing through the first and second operating switches 125, 127.

A circuit breaker 150 breaks a connection with the load 160 in response to a breaking signal generated by an over-current relay (not shown) when a fault current exceeding a threshold value flows. The over-current relay is connected to the electric power system to detect the fault current more than the threshold value, and generates a breaking signal to protect the load 160 against the fault current.

Now, an operation of the peak current limiting apparatus according to the present disclosure will be described in detail in terms of paths (a~j path).

The trigger element 110 on the path a is in the low impedance state when a normal current flows, and the normal current flows to the load 160 via i path through the main contact point switch 121 contacted by the contact point of the path b past the path b via the path a without generating any loss.

Meanwhile, when a fault current more than a threshold value is generated by an accident such as a thunder-stroke, an earth fault and a short-circuit, the trigger element 110 is changed to a high impedance state that generates a high resistant value to cause the fault current to be diverted into the path c.

The fault current comes to flow in the driving coil 123 of the path c before the contact point of the main contact point switch 121 is detached as much as the predetermined first gap from the occurrence time of the fault current. The driving coil 123 comes to generate a repulsive force in response to the fault current, and the contact point of the main contact point switch 121 is detached by the repulsive force to generate an arc. A conduction path is formed by the arc that has been generated by the main contact point switch 121.

When the contact point of the main contact point switch 121 is detached to be detached as much as the predetermined first gap, the contact point of the first operating switch 125 is brought into contact, and most of the fault current flowing into the driving coil 123 is partially diverted into the first operating switch 125 on the path c. The predetermined first gap may be so set up as to allow the contact point of the first operating switch 125 to be brought into contact between the timing of the fault current that is generated and the timing of a first peak value of the fault current.

In other words, the fault current may flow to the peak limiting impedance element 130 on the path d via the driving coil 123 on the path d, or to the peak limiting impedance element 130 on the path d via the path f through the first operating switch 125 on the path e. The first peak value of the fault current is limited to a predetermined value by the peak limiting impedance element 130. The fault current limited as much as a predetermined value flows to the path i via the conduction path generated by the arc generated by the main contact point switch 121 on the path b.

When the contact point of the main contact point switch 121 reaches a predetermined second gap after the contact point of the main contact point switch 121 is detached as much as the predetermined first gap, the contact point of the second operating switch 127 is brought into contact, and most of the fault current is introduced into the path e which has a low impedance value, and flows to the path i via the main contact point switch 121 on the path b through the second operating switch 127 on the path g past the first operating switch 125. The second gap may be so set up as to allow the contact point of the second operating switch 127 to contact following the first peak value of the fault current.

Thereby, the contact point of the main contact point switch 121 is completely detached, and when it comes to a current zero point made of a half period of the fault current, the arc generated by the main contact point switch 121 is completely quenched. Successively, the fault current passes the first operating switch 125 on the path e and the second operating switch 127 on the path g, and is limited via the current limiting load 140 on the path h and flows on the path i.

As apparent from the foregoing, the peak current limiting apparatus according to the present disclosure can prevent thermal mechanical damages of the electric power appliances connected at the rear end of the electric power system because the first peak value of the fault current is limited to below the predetermined value.

The aforementioned operations will be described with reference to the graphs of FIGS. 3a and 3b.

Figure 3A:
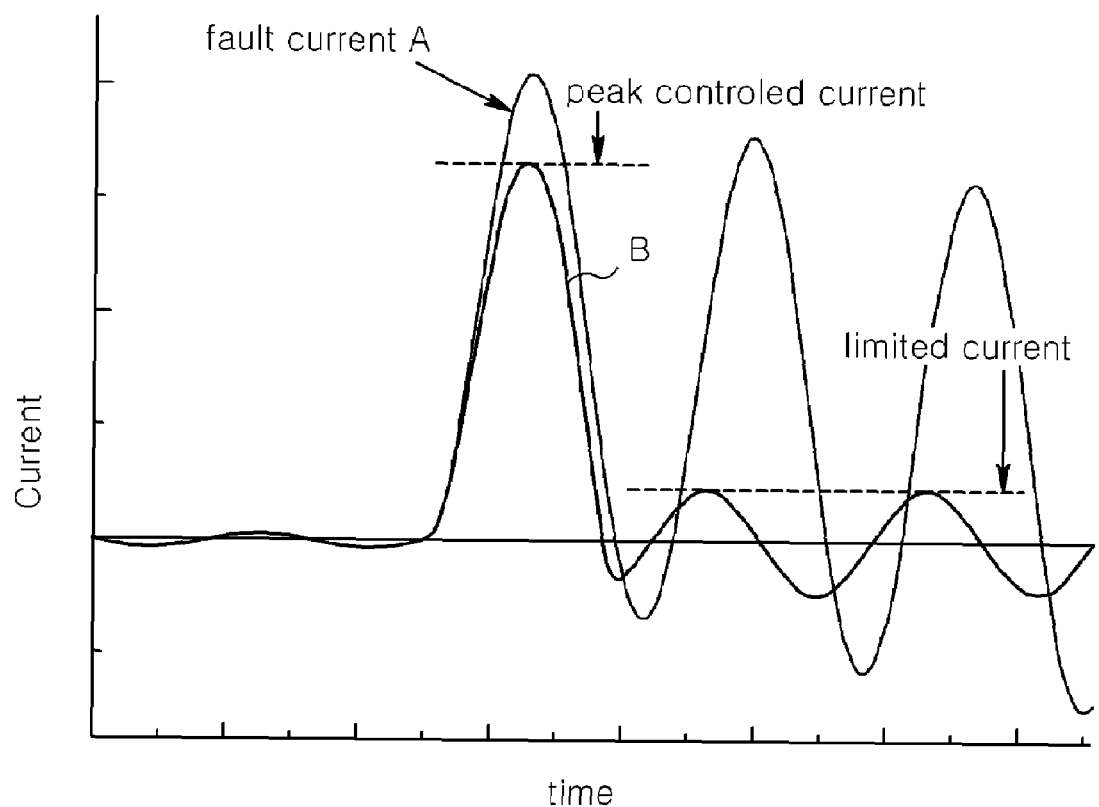
FIG. 3*a* is a graph illustrating a transition of a fault current according to time when the fault current is generated in FIG. 1.

FIG. 3a shows a fault current A of more than a threshold value having a very large first peak value. When the first peak value flows through the electric power appliances (e.g., a bus bar, an insulator and a circuit breaker), a current exceeding the rated short circuit breaking current flows to do thermal mechanical damages to the appliances. Generally, the first peak value in the fault current is the largest, and peak values of the fault current occurring thereafter taper off. Generally, the peak values of the fault current occurring thereafter generally do not inflict the thermal mechanical damages to the electric power appliances at the rear end of the electric power system. Therefore, the peak current limiting apparatus according to the present disclosure relates to an apparatus for limiting the first peak value of the fault current.

The peak current limiting apparatus according to the present disclosure may limit the first peak value of the fault current A using a fault current B which is within a value of the rated short circuit breaking current of the electric power appliances connected to the rear end of the electric power system. Furthermore, the peak current limiting apparatus according to the present disclosure current-limits the fault current past the current zero point made of a half period of the first period in the fault current B.

The peak current limiting apparatus according to the present disclosure provide that the electric power appliances are not damaged thermally and mechanically due to the fact that the first peak value of the fault current can be limited to within a value of the rated short circuit breaking current of the appliances connected to the rear end of the electric power system.

This present disclosure may provide that the appliances may be used without being changed to thereby obtain an economical benefit even if the transmission/distribution voltages that are used increase.

For example, the electric power appliances that are connected to the rear end of the peak current limiting apparatus usually have a rated short circuit breaking current value that is appropriate to the 154 Kv standard. If the used voltage is changed to 345 Kv, it is essential that the appliances should be replaced because the appliances have a rated short circuit breaking current value lower than that of the changed voltage standard. However, the peak current limiting apparatus according to the present disclosure can limit the first peak value of the fault current generated from the 345 kV to within the rated short circuit breaking current of the appliances (the rated short circuit breaking current set up based on the 154 Kv). Therefore, there is an advantage in that even if the used voltage is changed, the existing appliances may not be replaced and be used on the changed voltage when the peak current limiting apparatus according to the present disclosure is utilized.

Now, referring to FIG. 3b, a timing of the fault current that is more than a threshold value is p1 point, a timing of the fault current being diverted by the trigger element 130 is p2 point, and a timing of an arc generated by the contact point of the main contact point switch 121 being detached by the repulsive force generated from the driving coil 123 is p3 point.

Furthermore, a timing of the contact point of the main contact point switch 121 being detached to reach a predetermined first gap and to allow the contact point of the first operating switch 125 to be brought into contact is p4, and a timing of the contact point of the main contact point switch 121 reaching the predetermined second gap to allow the contact point of the second operating switch 127 to be brought into contact is p5.

The contact point of the main contact switch 121 is completely detached and a timing of an arc quenched is p6. The arc is generated by the main contact point switch 121. When it comes to a current zero point made of a half period of the fault current, the arc is quenched The a, b past the p2 timing point respectively define a fault current remaining in the trigger element on the path a and an arc current generated from the main contact point switch on the path b, and $V_{arc}$ defines an arc voltage generated from the main contact point switch 121. The arc current becomes almost zero when passing the p5 timing point contacted by the contact point of the second operating switch 127. It is understood that almost all the fault current may flow to the diverting pass having the least value of impedance.

While the present disclosure is described herein with reference to illustrative embodiments for particular applications, it should be understood that the disclosure is not limited thereto. Those having ordinary skill in the art and access to the teachings provided herein will recognize additional modifications, applications and embodiments within the scope thereof and additional fields in which the present disclosure would be of significant utility.

What is claimed is:

1. A peak current limiting apparatus comprising:
   a trigger element serially connected between a power supply source and a load, and configured for diverting a fault current to other paths connected in parallel when the fault current exceeds a threshold value;
   a main contact switch serially connected between the trigger element and the load;
   a driving coil connected in parallel with the trigger element, and configured for generating a repulsive force in response to the fault current in order to open contact points of the main contact switch;
   a peak limiting impedance element serially connected between the driving coil and a connection node between the trigger element and the main contact switch, and configured for limiting a first peak level of the fault current flowing through the driving coil to a predetermined level; and
   a first operating switch connected to the driving coil in parallel, the first operating switch including contact points configured to be closed in order to conduct the fault current after the contact points of the main contact switch are opened.

2. The apparatus of claim 1, wherein the trigger element is further configured for increasing an impedance value when the fault current exceeds the threshold value in order to divert the fault current to the other paths connected in parallel.

3. The apparatus of claim 1, wherein the trigger element is made of at least a superconductor, a Positive Temperature Coefficient Resistor (PTCR) or a liquid metal.

4. The apparatus of claim 1, wherein the peak limiting impedance element has an impedance value of 1~100 mΩ.

5. The apparatus of claim 1, further comprising a second operating switch including contact points configured to be closed after the contact points of the first operating switch are closed in order to conduct a fault current limited by the peak impedance element.

6. The apparatus of claim 5, further comprising a current limiting load connected in parallel with the main contact switch and configured for current-limiting a fault current conducted by the second operating switch when the contact points of the main contact switch are completely opened.

7. The apparatus of claim 5, wherein the contact points of the second operating switch are configured to close after an occurrence of a peak value of the fault current.

8. The apparatus of claim 5, wherein:
   a gap between the contact points of the first operating switch and a gap between the contact points of the second operating switch are smaller than a gap between the contact points of the main contact switch such that the contact points of the first operating switch and the contact points of the second operating switch are closed prior to the contact points of the main contact switch being completely opened; and
   the gap between the contact points of the first operating switch is smaller than the gap between the contact points of the second operating switch.

9. The apparatus of claim 1, wherein an arc generated from the main contact switch when detaching the contact points of the main contact switch is extinguished when the fault current comes to a current zero point that is a half period of the fault current and the contact points of the main contact switch are completely opened.

* * * * *